(12) United States Patent
Warr

(10) Patent No.: US 10,889,341 B2
(45) Date of Patent: Jan. 12, 2021

(54) CRAWLER DRIVE SYSTEM

(71) Applicant: Joy Global Surface Mining Inc, Milwaukee, WI (US)

(72) Inventor: Owen J. Warr, Muskego, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 305 days.

(21) Appl. No.: 15/983,468

(22) Filed: May 18, 2018

(65) Prior Publication Data

US 2018/0334205 A1 Nov. 22, 2018

Related U.S. Application Data

(60) Provisional application No. 62/508,731, filed on May 19, 2017.

(51) Int. Cl.
| | |
|---|---|
| *B62D 55/13* | (2006.01) |
| *B62D 55/08* | (2006.01) |
| *B60K 17/00* | (2006.01) |
| *B60K 1/00* | (2006.01) |
| *B60K 17/04* | (2006.01) |
| *B60K 7/00* | (2006.01) |
| *B62D 55/12* | (2006.01) |

(52) U.S. Cl.
CPC ............... *B62D 55/13* (2013.01); *B60K 1/00* (2013.01); *B60K 7/0007* (2013.01); *B60K 17/00* (2013.01); *B60K 17/043* (2013.01); *B62D 55/08* (2013.01); *B60Y 2200/25* (2013.01); *B62D 55/12* (2013.01)

(58) Field of Classification Search
CPC ........ B60K 17/14; B60K 17/145; B60K 1/00; B62D 55/12–55/135
See application file for complete search history.

(56) References Cited

U.S. PATENT DOCUMENTS

| | | | | |
|---|---|---|---|---|
| 3,872,939 | A * | 3/1975 | Eckert | B62D 11/18 180/6.48 |
| 4,739,852 | A * | 4/1988 | Stevens | B62D 55/125 180/372 |
| 5,119,923 | A * | 6/1992 | Jonsson | F16D 47/00 192/103 F |
| 5,293,125 | A * | 3/1994 | Griffen | G01P 1/026 310/68 B |
| 5,740,875 | A * | 4/1998 | Wilson, Sr. | B62D 55/12 180/308 |
| 5,816,034 | A * | 10/1998 | Peter | B60K 7/0015 56/11.4 |

(Continued)

FOREIGN PATENT DOCUMENTS

WO WO-2017135719 A1 * 8/2017 ............. F04B 39/08

*Primary Examiner* — Kevin Hurley
(74) *Attorney, Agent, or Firm* — Michael Best & Friedrich LLP

(57) ABSTRACT

A drive assembly for a mining vehicle includes a frame, a housing coupled to the frame, and a motor positioned in the housing. The motor includes a motor frame with a first axial end and a second axial end opposite the first axial end. The drive assembly also includes a transmission that is positioned at least partially within the frame. The transmission is coupled to the motor frame at the first axial end. The drive assembly further includes a support assembly that couples the second axial end of the motor frame to the housing.

16 Claims, 8 Drawing Sheets

(56) References Cited

U.S. PATENT DOCUMENTS

| | | | | |
|---|---|---|---|---|
| 5,842,377 A | * | 12/1998 | Hutchings | F16H 1/203 |
| | | | | 74/420 |
| 9,618,084 B2 | * | 4/2017 | Wagh | B62D 55/12 |
| 9,664,199 B2 | * | 5/2017 | Ripattila | F04D 29/042 |
| 10,138,729 B2 | * | 11/2018 | Fliearman | B60K 7/0015 |
| 10,206,340 B2 | * | 2/2019 | Hansen | B60K 7/0007 |
| 10,611,232 B2 | * | 4/2020 | Tigue | B62D 55/125 |
| 2014/0371028 A1 | * | 12/2014 | Billmeyer | F16H 1/46 |
| | | | | 475/337 |
| 2018/0166953 A1 | * | 6/2018 | Han | H02K 9/19 |
| 2020/0094894 A1 | * | 3/2020 | Kreis | F16H 7/06 |
| 2020/0108706 A1 | * | 4/2020 | Devreese | F16H 37/08 |

* cited by examiner

CRAWLER DRIVE SYSTEM

CROSS REFERENCE TO RELATED APPLICATIONS

This application claims priority to U.S. Provisional Patent Application No. 62/508,731, filed May 19, 2017, the entire content of which is incorporated herein by reference.

BACKGROUND

The present invention relates to mining vehicles, and more particularly to mining vehicle drive assemblies.

Drive assemblies used on mining vehicles are typically custom built to fit a specific vehicle for a specific application. However, custom drive systems are expensive to develop and lack the flexibility to be used across multiple, different vehicle platforms and applications.

SUMMARY

In one embodiment, the invention provides a drive assembly for a mining vehicle including a frame, a housing coupled to the frame, and a motor positioned in the housing. The motor includes a motor frame with a first axial end and a second axial end opposite the first axial end. The drive assembly also includes a transmission that is positioned at least partially within the frame. The transmission is coupled to the motor frame at the first axial end. The drive assembly further includes a support assembly that couples the second axial end of the motor frame to the housing.

In another embodiment, the invention provides a drive assembly for a mining vehicle including a housing and a motor positioned in the housing. The motor includes a first axial end, a second axial end opposite the first axial end, and a standardized face plate at the first axial end. The drive assembly also includes a transmission having a standardized input face coupled to the standardized face plate of the motor and a support assembly coupling the second axial end of the motor to the housing.

In another embodiment, the invention provides a support assembly for supporting a motor within a housing on a frame of a mining vehicle. The support assembly including a mount with an upper flange portion and a lower yoke portion. The flange portion includes an aperture and the yoke portion is configured to be coupled to an axial end of the motor. The support assembly also includes a fastener extending through the aperture. The support assembly further includes a nut coupled to an end of the fastener. The nut is slidably receivable within a slot of the housing to couple the support assembly to the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
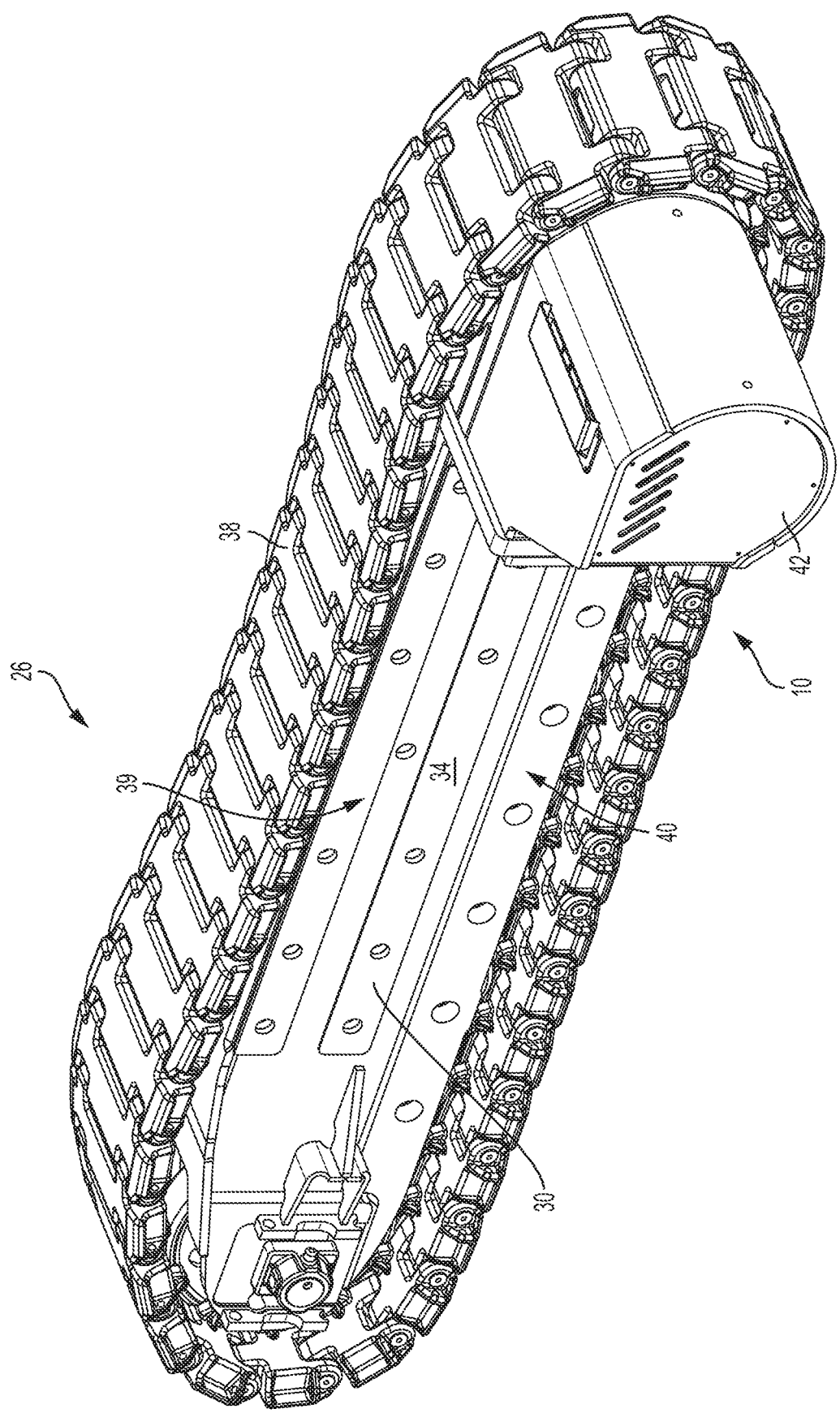
FIG. 1 is a perspective view of a crawler leg.
Figure 2:
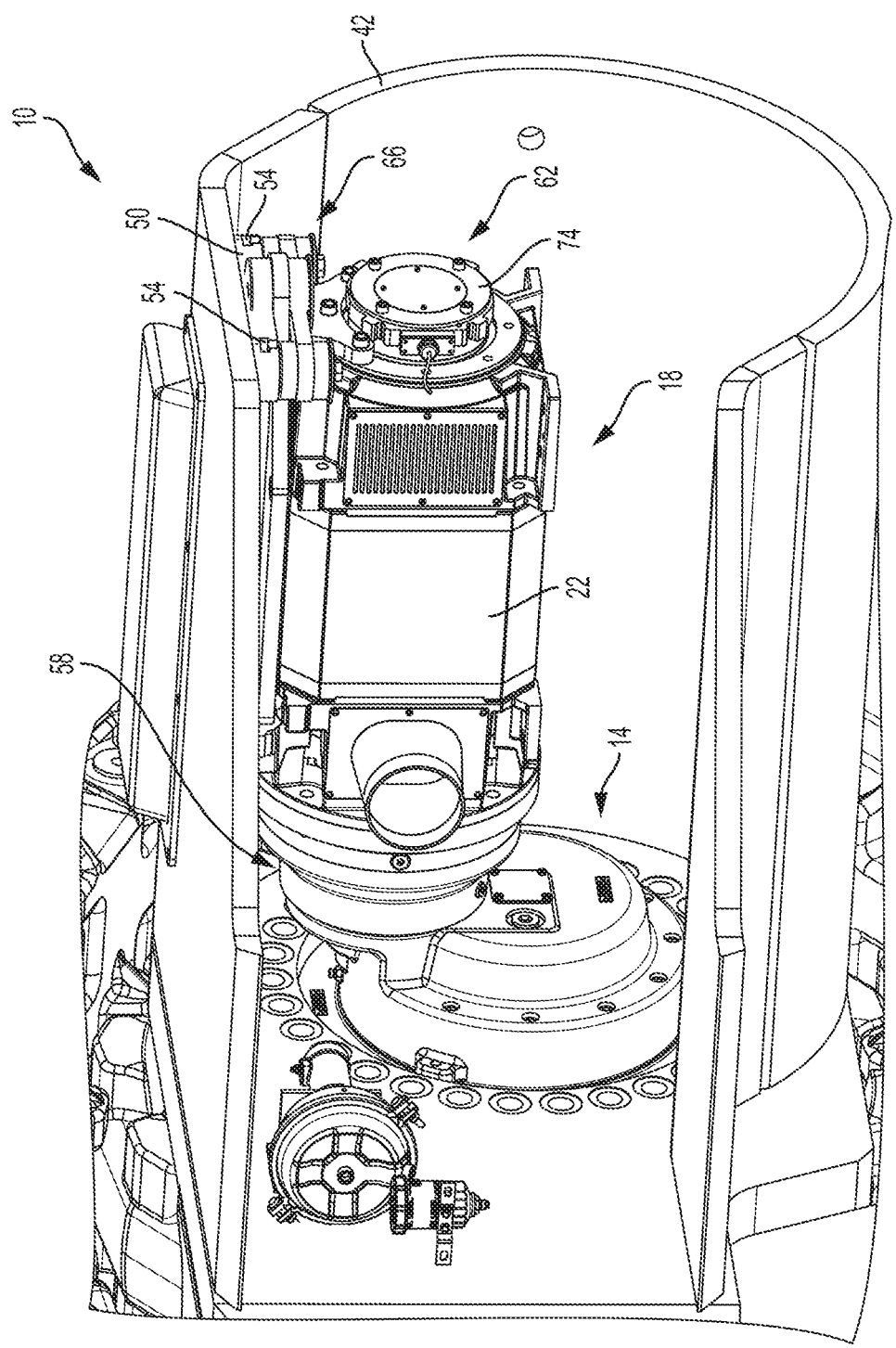
FIG. 2 a perspective view of a drive assembly attached to the crawler leg of FIG. 1.

FIGS. 1-6 show a drive assembly 10 that is configured to be coupled to a mining vehicle (e.g., a sizer, a shovel, etc.) or other work vehicle to drive movement of that vehicle. With reference to FIG. 2, the drive assembly 10 includes a standardized transmission 14 and a motor 18 with a standardized motor frame 22 (i.e., motor housing) such as a National Electrical Manufacturer Association (NEMA) standard or International Electrotechnical Commission (IEC) standard frame. The drive assembly 10 is a final drive that can be coupled to either a crawler or a wheel. The standardized motor frame 22 of the motor 18 allows the transmission 14 and the motor 18 to be directly coupled together without any additional or customized coupling devices. As explained in greater detail below, since the drive assembly 10 utilizes standardized components (e.g., a NEMA frame motor 18), the drive assembly 10 can be utilized in a variety of vehicle applications and supported on the vehicle in advantageous ways. The terms "standard," "standardized," and the like as used herein mean configured in accordance with NEMA standards, IEC standards, or any other motor, transmission, or drivetrain standards promulgated by a governmental or trade organization.

With reference to FIG. 1, the drive assembly 10 is coupled to a crawler leg 26. In other embodiments, the drive assembly 10 may be coupled to other wheeled or crawler-type vehicles (e.g., cranes, sizers, feeder/breakers, etc.). The crawler leg 26 includes a frame 30 with a first side 34, a second side (not shown) opposite the first side 34, and a track 38 wrapped around the outside of the frame 30. The frame includes an upper side 39 and a lower side 40 opposite the upper side 39. The track 38 is configured to engage a ground surface as it passes along the lower side 40.

Figure 3:
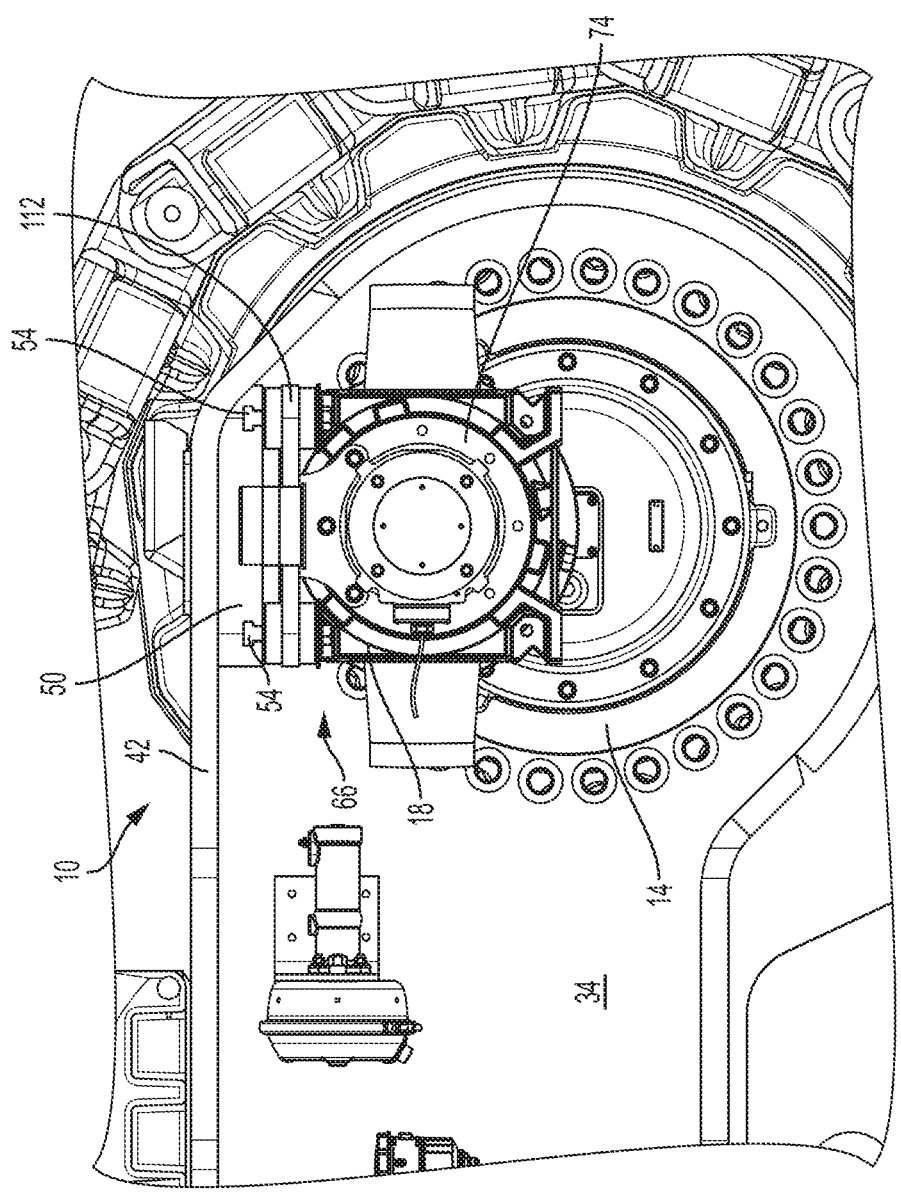
FIG. 3 is a side view of the drive assembly of FIG. 2.

The drive assembly 10 is coupled to the first side 34 of the frame 30 and is positioned in a housing 42 that extends from the frame 30. As shown in FIGS. 2 and 3, the housing 42 includes an upper support 50 that supports the motor 18. The upper support 50 includes T-shaped slots 54, which, in the illustrated embodiment, extend the full length of the upper support 50 in a direction perpendicular to the first side 34 of the frame 30. The motor 18 includes a first or inner axial end 58 and a second or outer axial end 62 opposite the first axial end 58 (FIG. 2). In the illustrated embodiment, the first axial end 58 is coupled directly to the transmission 14, and the second axial end 62 is coupled to the upper support 50 of the housing 42 via a support assembly 66 (e.g., a yoke assembly). The second axial end 62 of the motor 18 may thus by suspended underneath the upper support 50 by the support assembly 66.

A first face plate 70 (FIG. 6) is provided on the first axial end 58 of the motor frame 22 to couple the motor frame 22 to the transmission 14. The first face plate 70 can be configured as a C-Face or can be configured as a D-Face flange (e.g., according to a NEMA or IEC standard). A second face plate 74 (FIG. 3) is positioned on the second axial end 62 of the motor 18 to couple the motor frame 22 to the support assembly 66. The second face plate 74 can either be adapted to a C-Face or can itself be configured as a C-Face. The second face plate 74 is mounted to the support assembly 66. In the illustrated embodiment, the first face plate 70 is a NEMA standard D-Face Flange and the second face plate 74 is a NEMA standard C-Face. In other embodiments, the first face plate 70 and the second face plate 74 can be reversed so that the first axial end 58 of the motor frame 22 includes a NEMA C-Face and the second axial end 62 of the motor frame 22 includes a NEMA D-Face Flange. In further embodiments, the first face plate 70 and the second face plate 74 can be other NEMA or IEC standard face plate sizes or face flange sizes.

Figure 5:
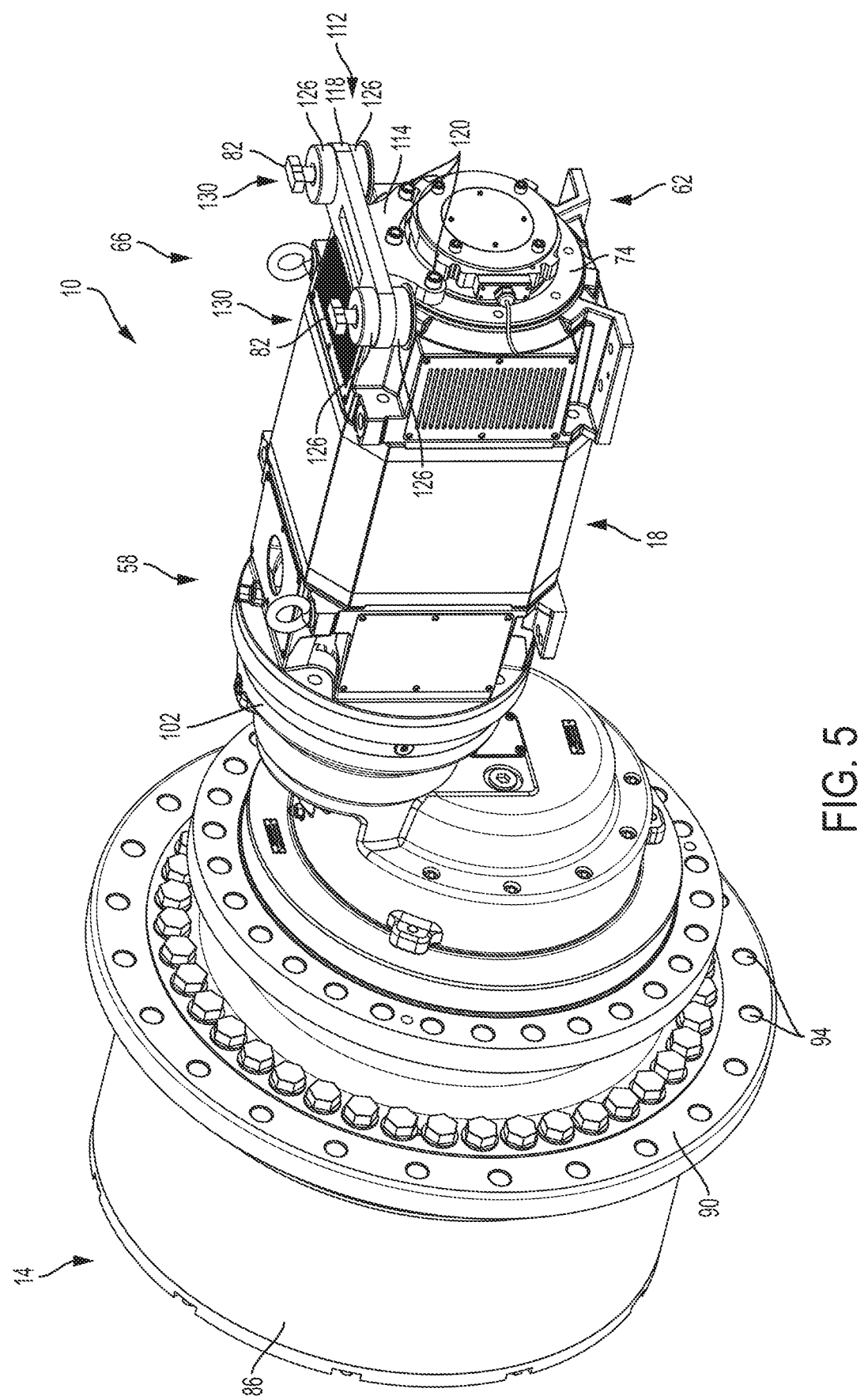
FIG. 5 is an isolated view of the drive assembly of FIG. 2
Figure 6:
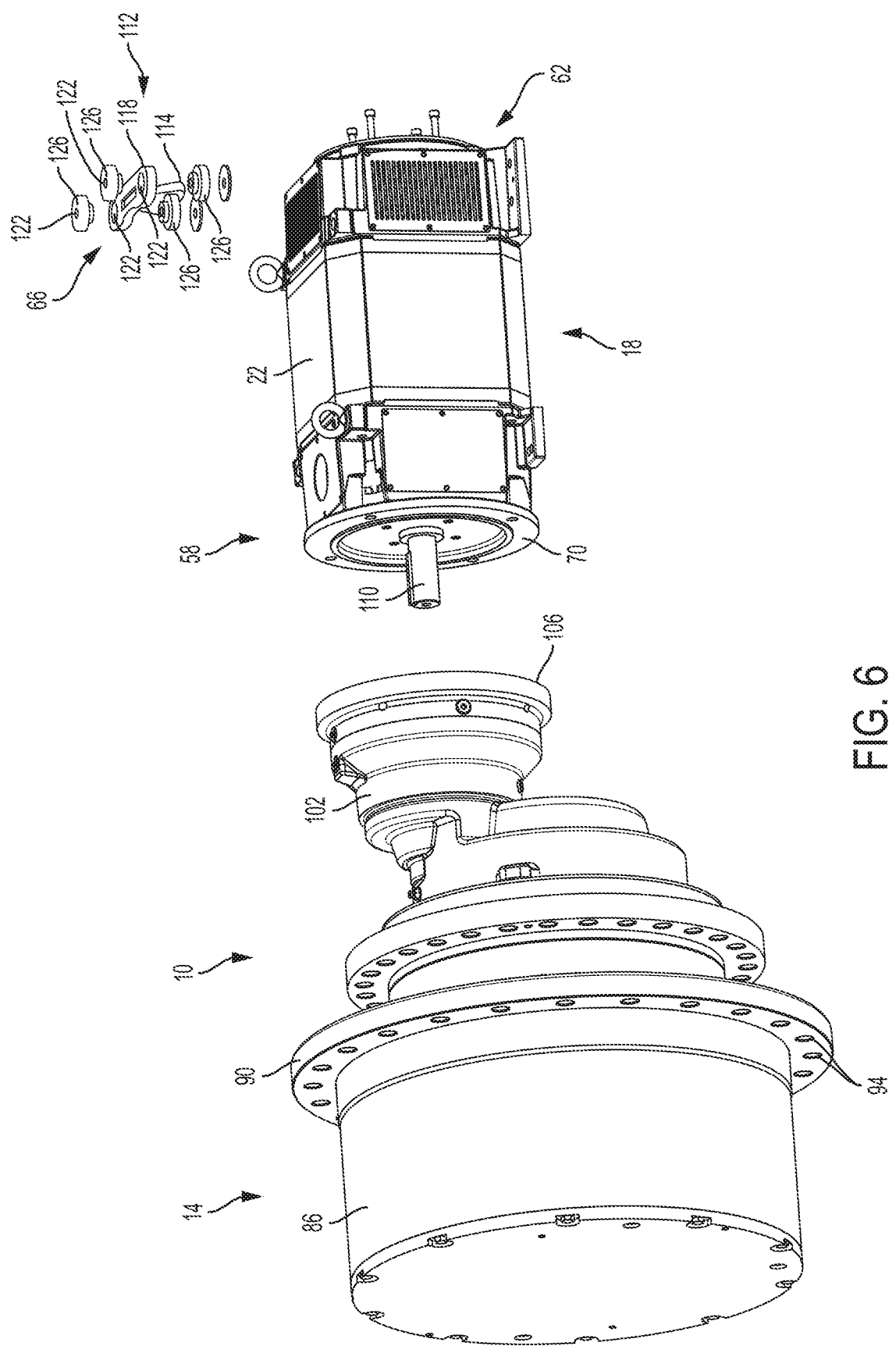
FIG. 6 is an exploded view of the drive assembly of FIG. 5.

With reference to FIGS. 5 and 6, the transmission 14 includes a drum 86 that is positioned within the frame 30 and houses drive components (not shown) to drive the track 38 of the crawler leg 26. An outer flange 90 extends radially from the drum 86 and includes a plurality of openings or slots 94 positioned about the circumference of the flange 90. Fasteners (e.g., bolts, screw, etc.; not shown) are placed in the slots 94 to secure the transmission 14 to the first side 34 of the frame 30. The illustrated transmission 18 also includes a neck portion 102, extending outwardly from the drum 86, with an input face 106 (FIG. 6). In some embodiments, the input face 106 may include an adapter ring to facilitate coupling with the first face plate 70, which may be a (NEMA or IEC) C-Face or D-Face flange.

With reference to FIG. 6, the motor 18 includes an output shaft 110 extending from the first axial end 58 perpendicular to the first side 34 of the frame 30. The output shaft 110 couples directly to a female shaft (not shown) within the neck portion 102 of the transmission 14 so as to form a direct shaft-to-shaft connection between the motor 18 and the transmission 14. As described in greater detail below, the T-shaped slots 54 extend parallel to the output shaft 110 of the motor 18 and the female shaft of the transmission 14 to facilitate coaxial alignment of the output shaft 110 and the input shaft during installation and assembly.

Figure 4:
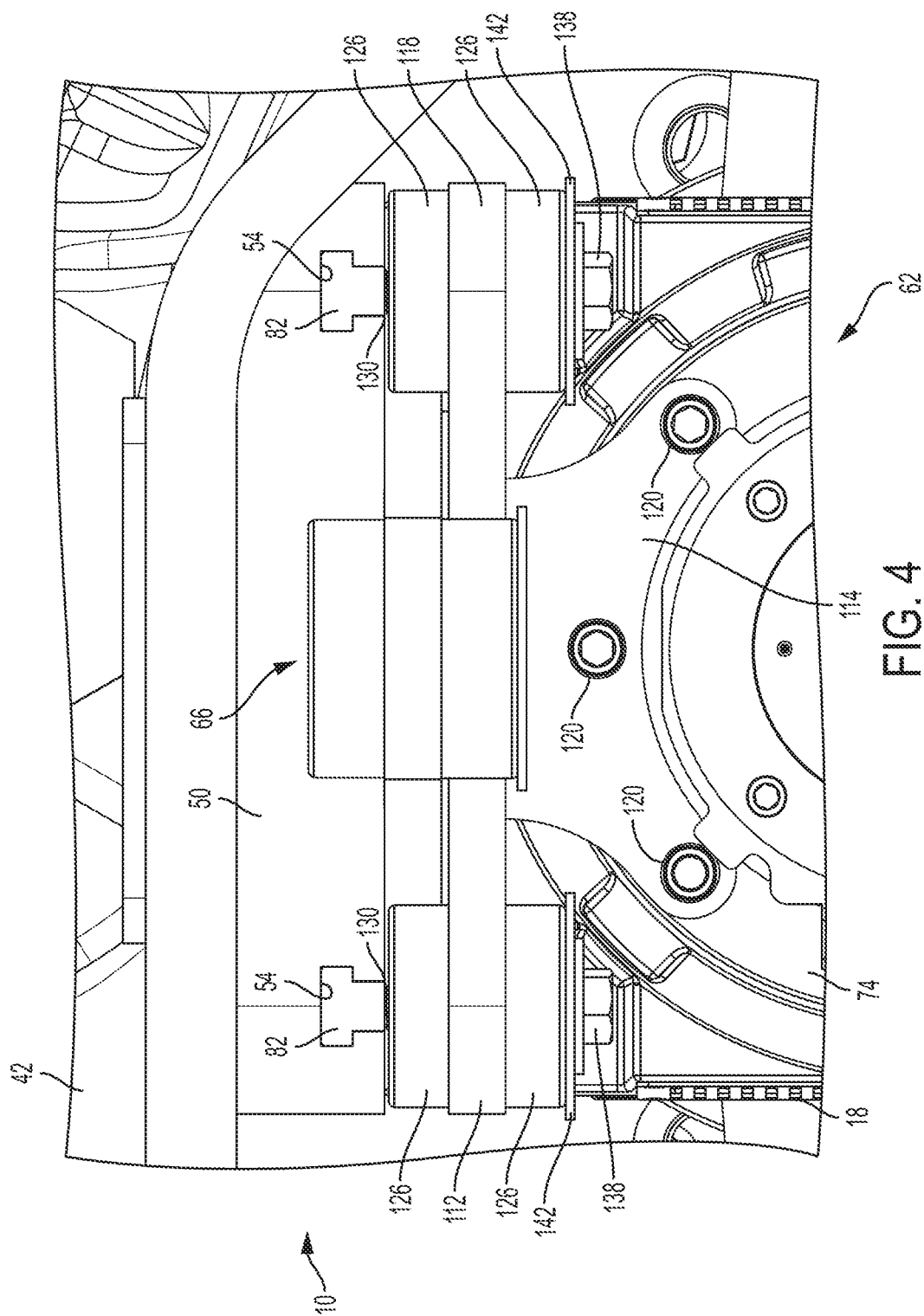
FIG. 4 is a side view of the drive assembly of FIG. 2 detailing a support assembly.

With reference to FIGS. 4 and 5, the support assembly 66 includes a mount 112 with a yoke portion 114 and a flange portion 118. The yoke portion 114 includes a plurality of apertures 120 that receive fasteners in order to secure the support assembly 66 to the second face plate 74 on the second axial end 62 of the motor 18. The flange portion 118 is positioned in between two elastic spacers 126 that absorb vibrations. The spacers 126 and the flange portion 118 include apertures 122 (FIG. 6) through which a fastener 130 extends. On one end of each fastener 130 is a T-shaped nut 82 that corresponds with the T-shaped slots 54 on the upper support 50. Now referencing FIG. 4, a nut 138 and washer 142 secure the fastener 130 to the mount 112 on the other end of the fastener 130 opposite the T-shaped nut 82. In the illustrated embodiment, two fasteners 130 with corresponding T-shaped nuts 82, mate with the T-shaped slots 54 of the upper support 50. In other embodiments, the mount 112 can include any other number of fasteners 130 and T-shaped nuts 82 (and preferably between one and four) to mate with corresponding T-shaped slots 54 on the upper support 50. In other embodiments, the slots 54 and nuts 82 may have other cooperating configurations, such as a dovetail configuration, etc.

When installing the drive assembly 10 on to a vehicle, the transmission drum 86 is positioned within the frame 30 of the crawler leg 26. As described above, the outer flange 90 of the transmission 14 is secured to the frame 30 with a plurality of fasteners extending through the slots 94 (FIG. 5).

The T-shaped nuts 82 extending from the mount 112 are slid into the T-shaped slots 54 in the upper supports 50 (FIG. 4). The mating of the T-shaped nuts 82 and T-shaped slots 54 may assist in concentrically aligning the output shaft 110 of the motor 18 and the female shaft of the transmission 14. Since the first and second face plates 70, 74 are standardized, tighter tolerances can be achieved when mounting the drive assembly 10 via the face plates 70, 74. In this way, stresses due to misalignment are minimized. The motor 18 is slidable along the T-shaped slots 54 until the first face plate 70 abuts the input face 106 of the transmission 18. Fasteners (not shown) may then secure the transmission input face 106 to the first face plate 70.

In addition to facilitating concentric alignment of the output shaft 110 of the motor 18 with the female shaft of the transmission 14, the configuration of the support assembly 66 allows motors that would typically not be usable in combination with a vehicle transmission because of their size, shape, rating, etc. to be mounted and supported on the vehicle. The spacers 126 isolate the motor 18 from vibrations that may be experienced on vehicles with large vibrational loads. The vibrational isolation of the support assembly 66 allows motors not typically equipped for high vibrational loads to be used on a variety of vehicles with high vibrational loads. Additionally, the support assembly 66 compensates for overall length (e.g., axial length) variations of the motor 18 because the nuts 82 can be positioned at any point along the slots 54.

The drive assembly 10 can thus be used with a wide variety of motors and transmissions, in a wide variety of different vehicle applications. Using standardized motor frames and transmission sizes reduces the cost of the drive assembly 10 and avoids the need for application-specific motor and transmission designs that are typically required on mining vehicles and other work vehicles. In other words, the support assembly 66 enables the use of standardized components that would otherwise not be suitable for the working environments of vehicles with large vibrational loads and tight manufacturing tolerances. In addition, because the support assembly 66 couples to standardized components, other conventional add-on options can be added to the motor 18 or transmission 14. For example, the motor 18 can be combined with such add-on options as a motor brake, an encoder, a resolver, a condensate heater, etc. and the transmission 14 can be combined with such add-on options as an integral brake, hydraulic or electric motor input face.

Figure 7:
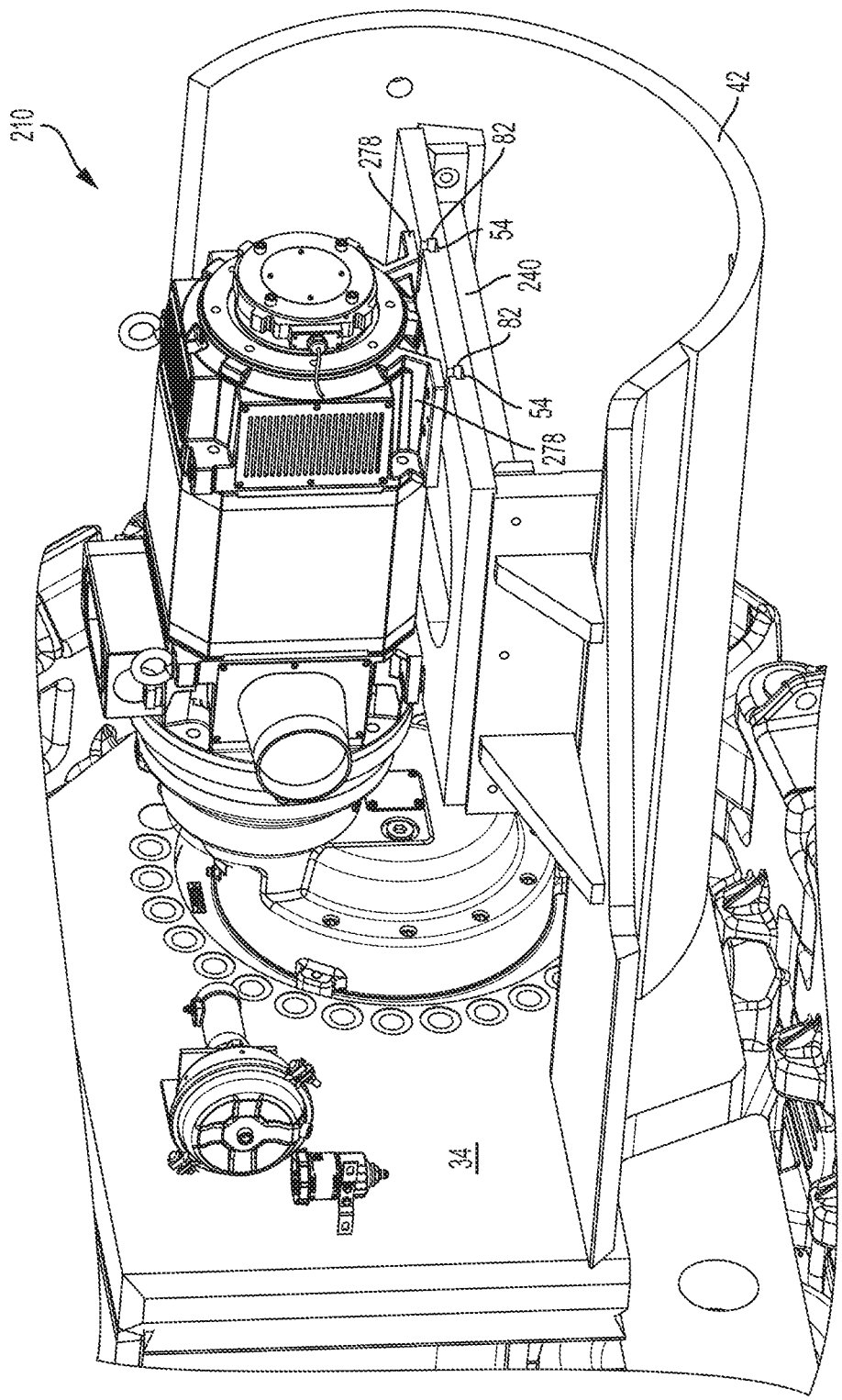
FIG. 7 is a perspective view of a drive assembly according to another embodiment of the invention.
Figure 8:
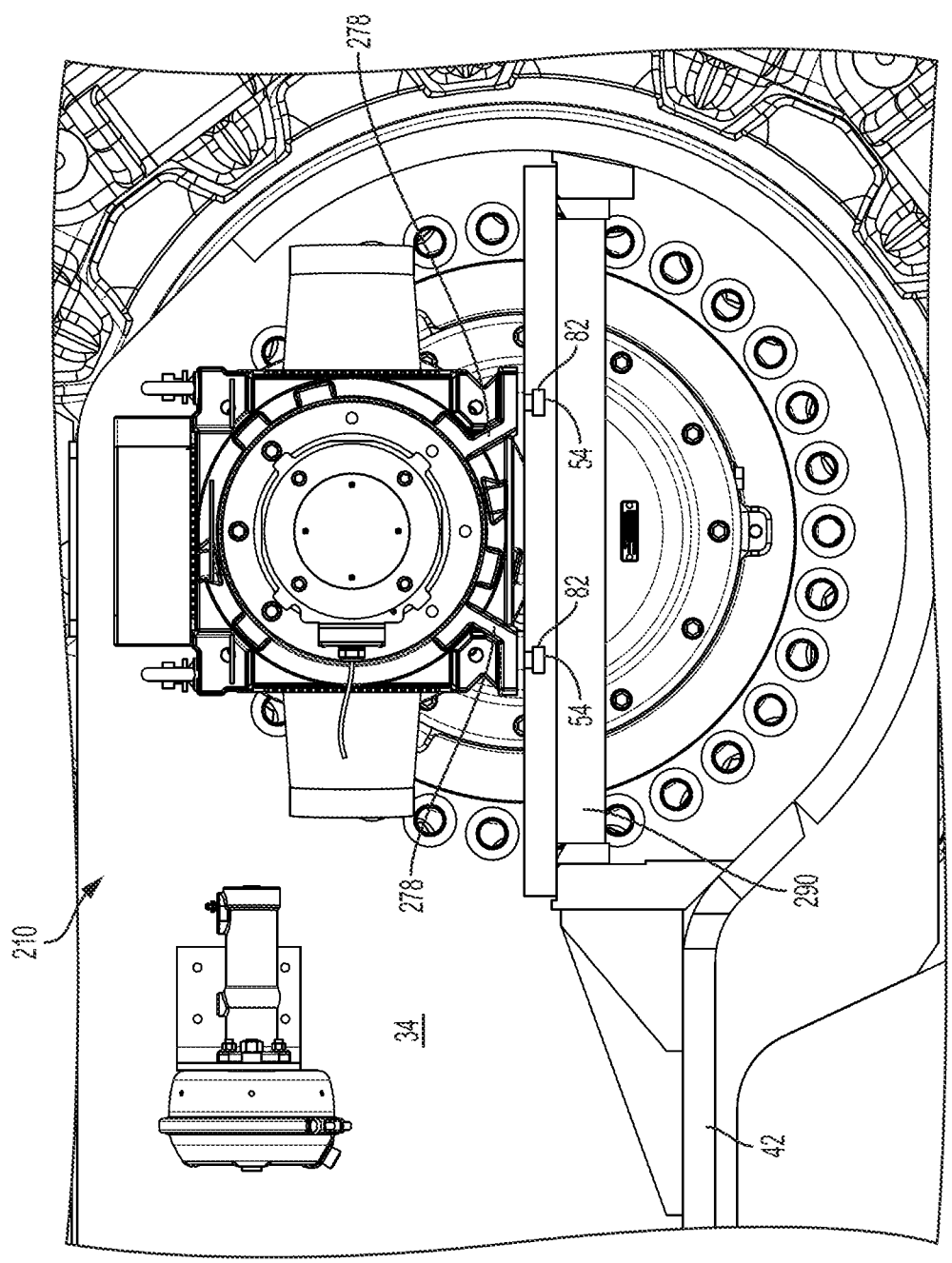
FIG. 8 is a side view of the drive assembly of FIG. 7.

With reference to FIGS. 7 and 8, a drive assembly 210 is illustrated according to another embodiment of the invention. The drive assembly 210 differs from the drive assembly 10 in that the drive assembly 210 is supported by a lower support 240 in the housing 42 (as an alternative to the upper support 50 described above). The lower support 240 includes T-shaped slots 54 that extend the full length of the lower support 240 perpendicular to the first side 34 of the frame 30. In the drive assembly 210, the motor 18 also includes two feet 278 that are supported on the lower support 240 of the housing 42. The feet 278 each support T-shaped nuts 82 that correspond to the T-shaped slots 54 on the lower support 240. The T-shaped nuts 82 on the feet 78 of the motor 18 are slid into the T-shaped slots 54 in the lower support 240. As described above with reference to drive assembly 10, T-shaped nuts 82 of the motor 18 are slidable within the T-shaped slots 54 until the first face plate 70 abuts the input face 106 of the transmission 18. Fasteners then secure the transmission input face 106 to the first face plate 70. In further embodiments, the drive assemblies 10, 210 may include both the upper support 50 and the lower support 240.

Various features and advantages of the invention are set forth in the following claims.

What is claimed is:

1. A drive assembly for a mining vehicle comprising:
   a housing;
   a motor positioned in the housing, the motor including a first axial end, a second axial end opposite the first axial end, and a standardized face plate at the first axial end;
   a transmission having a standardized input face coupled to the standardized face plate of the motor; and
   a support assembly coupling the second axial end of the motor to the housing.

2. The drive assembly of claim 1, wherein the transmission is coupled to the motor with a direct shaft to shaft connection.

3. The drive assembly of claim 1, wherein the motor includes an output shaft, wherein the housing includes a slot extending parallel to the output shaft, and wherein the support assembly includes a fastener that is received within the slot.

4. The drive assembly of claim 1, wherein the support assembly suspends the second axial end of the motor from the housing.

5. The drive assembly of claim 1, wherein the support assembly includes a mount with a yoke portion and a flange portion.

6. The drive assembly of claim 5, wherein the yoke portion is coupled to the second axial end of the motor, and the flange portion is coupled to the housing.

7. The drive assembly of claim 1, wherein the face plate is a first face plate, and wherein the motor further includes a second standardized face plate at the second axial end.

8. The drive assembly of claim 7, wherein the first face plate has a different configuration than the second face plate.

9. The drive assembly of claim 8, wherein the first face plate includes a NEMA D face and the second face plate includes a NEMA C face.

10. The drive assembly of claim 1, wherein the support assembly includes an elastic member between the motor and the housing.

11. The drive assembly of claim 1, wherein the support assembly is coupled to an upper support of the housing.

12. The drive assembly of claim 1, wherein the support assembly is coupled to a lower support of the housing.

13. The drive assembly of claim 1, wherein the transmission is positioned at least partially within a frame of a crawler leg.

14. The drive assembly of claim 13, further comprising a crawler track extending around the frame.

15. The drive assembly of claim 1, wherein the support assembly includes:
    a mount including an upper flange portion and a lower yoke portion, the upper flange portion having an aperture and the lower yoke portion configured to be coupled to the second axial end of the motor;
    a fastener extending through the aperture; and
    a nut coupled to an end of the fastener, the nut being slidably receivable within a slot of the housing to couple the support assembly to the housing.

16. The drive assembly of claim 15, further comprising an elastic member positioned between the flange portion and the nut.

* * * * *